United States Patent
Tsurumi (10) Patent No.: US 9,428,209 B2
(45) Date of Patent: Aug. 30, 2016

(54) STEERING DEVICE

(75) Inventor: Yasuaki Tsurumi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 14/365,966

(22) PCT Filed: Dec. 21, 2011

(86) PCT No.: PCT/JP2011/007182
§ 371 (c)(1),
(2), (4) Date: Jun. 16, 2014

(87) PCT Pub. No.: WO2013/093972
PCT Pub. Date: Jun. 27, 2013

(65) Prior Publication Data
US 2014/0360311 A1 Dec. 11, 2014

(51) Int. Cl.
*B62D 1/16* (2006.01)
*B62D 5/00* (2006.01)
*B62D 5/04* (2006.01)
*B62D 15/00* (2006.01)

(52) U.S. Cl.
CPC .............. *B62D 1/166* (2013.01); *B62D 5/008* (2013.01); *B62D 5/0478* (2013.01); *B62D 15/00* (2013.01)

(58) Field of Classification Search
CPC ..... B62D 5/008; B62D 5/0478; B62D 1/166
USPC .......................................................... 701/41
See application file for complete search history.

(56) References Cited

U.S. PATENT DOCUMENTS

| | | | |
|---|---|---|---|
| 5,489,004 A * | 2/1996 | Shimizu | B62D 1/166 180/400 |
| 7,213,678 B2 * | 5/2007 | Park | B62D 1/166 180/428 |
| 7,392,878 B2 * | 7/2008 | Ono | B62D 5/008 180/421 |
| 2005/0209752 A1 * | 9/2005 | Ono | B62D 6/003 701/41 |
| 2009/0105907 A1 * | 4/2009 | Yamaguchi | B62D 5/008 701/41 |
| 2010/0070137 A1 * | 3/2010 | Yamaguchi | B62D 5/008 701/41 |
| 2010/0331133 A1 * | 12/2010 | Joachim | F16H 1/2854 475/207 |
| 2011/0029200 A1 * | 2/2011 | Shah | B62D 5/008 701/41 |
| 2012/0245799 A1 * | 9/2012 | Ono | B62D 5/008 701/42 |
| 2015/0274196 A1 * | 10/2015 | Park | B62D 5/008 701/41 |

FOREIGN PATENT DOCUMENTS

| | | |
|---|---|---|
| JP | A-2006-096187 | 4/2006 |
| JP | A-2010-215067 | 9/2010 |
| WO | WO 2005/058670 A1 * | 6/2005 |

* cited by examiner

Primary Examiner — Ruth Ilan
(74) Attorney, Agent, or Firm — Oliff PLC

(57) ABSTRACT

In a steering device, the transmission ratio variable mechanism changes a transmission ratio. The transmission ratio is a ratio of the turning angle of a wheel to the steering angle of a steering wheel. In the stationary-steering mode, the ECU sets a low transmission-ratio state where the transmission ratio is reduced compared with the transmission ratio in an ordinary mode when the steering wheel is increasingly steered while setting a zero-transmission-ratio state where coupling between the steering wheel and the wheel is released to set the transmission ratio to zero when the steering wheel is returned.

3 Claims, 6 Drawing Sheets

STEERING DEVICE

TECHNICAL FIELD

The present invention relates to a steering device, in particular, steering device that includes a transmission ratio variable mechanism.

BACKGROUND ART

A conventionally proposed transmission-ratio variable device employs an electric motor to change a transmission ratio that is a ratio of a turning angle of a wheel to a steering angle of a steering wheel (for example, see Patent Literature 1). Using this transmission-ratio variable device allows changing the turning angle of the wheel with respect to the steering angle of the steering wheel depending on the situation.

CITATION LIST

Patent Literature

Patent Literature 1: Japanese Patent Application Publication No. 2010-215067 (JP 2010-215067 A)

SUMMARY OF THE INVENTION

Technical Problem

A driver needs a great deal of power during what is called stationary steering in which a steering wheel is steered during vehicle stop. However, in the technique disclosed in the above-described patent literature, an electric power steering unit operates corresponding to a steering torque during stationary steering. Therefore, it is necessary to use a large motor for power steering so as to generate a required assisting force. Accordingly, it has been difficult to achieve a reduced size, a reduced cost, or a removal of the motor for power steering.

Therefore, the present invention is made to solve the above-described problem, and an object of the present invention is to achieve a reduced size, a reduced cost, or a removal of the motor for power steering.

Solution to Problem

To solve the above-described problem, a steering device according to an aspect of the present invention includes a transmission ratio variable mechanism configured to change a transmission ratio that is a ratio of a turning angle of a wheel to a steering angle of a steering wheel. In a case where the steering wheel is steered at a vehicle speed less than a predetermined vehicle speed, the transmission ratio variable mechanism reduces the transmission ratio compared with a case of steering at a vehicle speed equal to or more than the predetermined vehicle speed when the steering wheel is increasingly steered while the transmission ratio variable mechanism reduces the transmission ratio compared with the transmission ratio during additional steering when the steering wheel is returned.

This aspect allows stationary steering with the reduced transmission ratio. Additionally, the transmission ratio is reduced when the steering wheel is returned compared with the transmission ratio during additional steering. Thus, repeating additional steering and return steering of the steering wheel allows turning the wheel to a large degree.

In a case where the steering wheel is returned at a vehicle speed less than the predetermined vehicle speed, the transmission ratio variable mechanism may reduce the transmission ratio compared with the transmission ratio during additional steering until the steering wheel reaches an ordinary steering angle to be positioned in order to turn the wheel at a vehicle speed equal to or more than the predetermined vehicle speed to an angle of the wheel at which returning of the steering wheel is started.

This aspect facilitates returning the steering wheel to the ordinary steering angle without turning the wheel in the opposite direction. This allows reducing uncomfortable feeling when the vehicle speed becomes equal to or more than the predetermined vehicle speed and then the steering wheel is returned to the ordinary steering angle.

The transmission ratio variable mechanism may be configured to allow the steering wheel to rotate at least in a returning direction. In a case where a steering force to the steering wheel is released at a vehicle speed less than the predetermined vehicle speed, the transmission ratio variable mechanism may return the steering wheel until the steering wheel reaches the ordinary steering angle.

With this aspect, simply releasing the steering wheel by the driver allows returning the steering wheel to the ordinary steering angle. This allows more appropriately reducing uncomfortable feeling when an ordinary steering condition is satisfied and then the transmission ratio becomes high.

Advantageous Effects of Invention

The present invention allows achieving a reduced size, a reduced cost, or a removal of the motor for power steering.

MODES FOR CARRYING OUT THE INVENTION

The following describes an embodiment of the present invention (hereinafter referred to as "the embodiment") in detail with reference to the drawings.

Figure 1A:
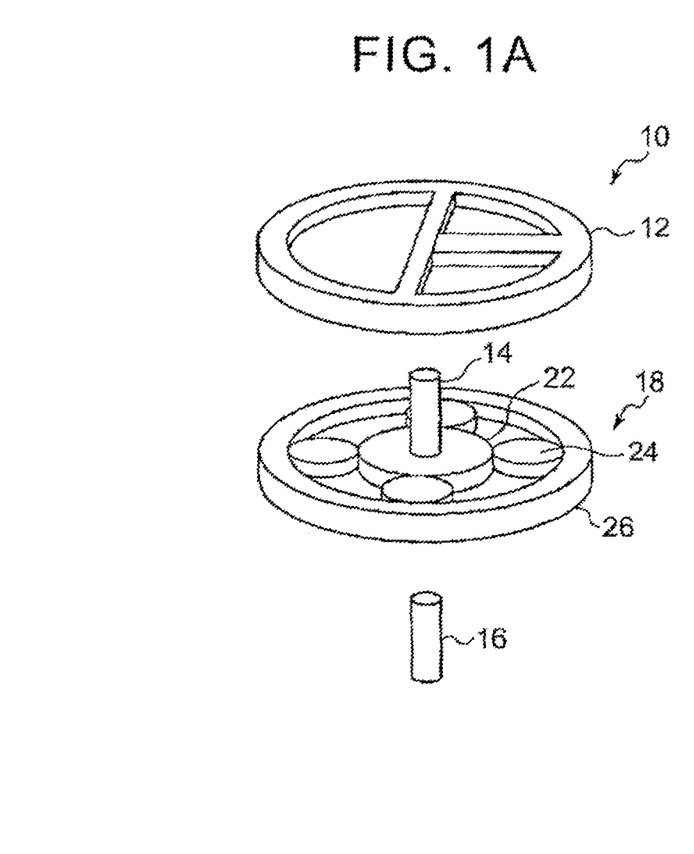
FIG. 1A and FIG. 1B are diagrams each illustrating a configuration of a steering device according to this embodiment.
Figure 1B:
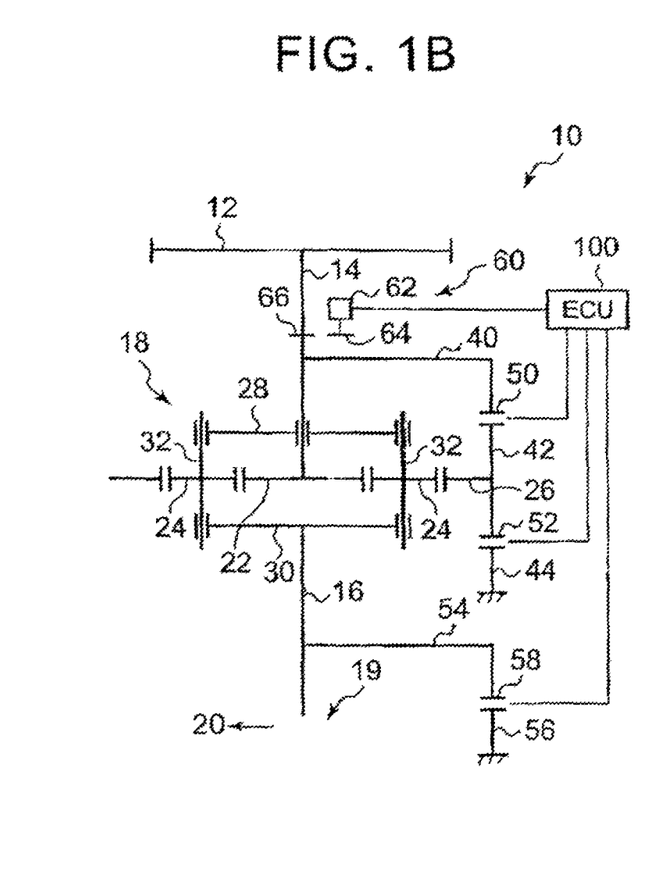

FIG. 1A and FIG. 1B are diagrams illustrating a configuration of a steering device 10 according to this embodiment. FIG. 1A is a perspective view of a main configuration of the steering device 10. FIG. 1B schematically illustrates the configuration of the steering device 10.

The steering device 10 is a device for turning the wheel 20 corresponding to a steering angle of a steering wheel 12. The steering device 10 includes the steering wheel 12, a steering shaft 14, a main shaft 16, a transmission ratio variable mechanism 18, and a steering mechanism 19.

The transmission ratio variable mechanism 18 changes a transmission ratio that is a ratio of the turning angle of the wheel 20 to the steering angle of the steering wheel 12. The transmission ratio variable mechanism 18 includes a sun gear 22, a planetary gear 24, a ring gear 26, a first disk 28, a second disk 30, a shaft 32, a first rotating member 40, a drum 42, a fixing member 44, a first clutch 50, a second clutch 52, a second rotating member 54, a fixing member 56, a third clutch 58, a return mechanism 60, and an electronic control unit (hereinafter referred to as "ECU") 100.

The upper end of the steering shaft 14 is coaxially fixed to the steering wheel 12. The lower end of the steering shaft 14 is coaxially fixed to the sun gear 22. The sun gear 22 engages with a plurality of the planetary gears 24 in the same shape. Additionally, the ring gear 26 engages with the plurality of planetary gears 24 to surround the outer periphery of the sun gear 22 and the planetary gears 24. In this embodiment, the four planetary gears 24 are used. Here, obviously, the number of the planetary gears 24 is not limited to two.

In each of the plurality of planetary gears 24, the shaft 32 coaxially passes through the planetary gear 24 to be fixed. On the upper side of the sun gear 22, the first disk 28 is arranged coaxially with the steering shaft 14 and rotatably with respect to the steering shaft 14. Each upper end of the plurality of shafts 32 is rotatably supported on this first disk 28. On the downside of the sun gear 22, the second disk 30 is arranged rotatably and coaxially with the sun gear 22. Each upper end of the plurality of the shafts 32 is rotatably supported on this second disk 30.

The upper end of the main shaft 16 is coaxially fixed to the second disk 30. The lower end of the main shaft 16 is coupled to the steering mechanism 19. The steering mechanism 19 converts the rotational motion of the main shaft 16 into a turning motion of the wheel 20 as a turning object. The configuration of the steering mechanism 19 is publicly known. Therefore, the description of the detailed structure of the steering mechanism 19 is omitted.

The first rotating member 40 is fixed to the steering shaft 14. The drum 42 is fixed to the ring gear 26. The first clutch 50 is disposed between the first rotating member 40 and the drum 42. The fixing member 44 is fixed to a vehicle main body. The second clutch 52 is disposed between the fixing member 44 and the drum 42. The second rotating member 54 is fixed to the main shaft 16. The fixing member 56 is fixed to the vehicle main body. The third clutch 58 is disposed between the second rotating member 54 and the fixing member 56.

When the first clutch 50 is turned on, both of the first rotating member 40 and the drum 42 are fixed to rotate. When the first clutch 50 is turned off, the first rotating member 40 and the drum 42 can rotate relatively to each other. When the second clutch 52 is turned on, both of the drum 42 and the fixing member 44 are fixed to rotate. When the first clutch 50 is turned off, the drum 42 and the fixing member 44 can rotate relatively to each other. When the third clutch 58 is turned on, both of the second rotating member 54 and the fixing member 56 are fixed to rotate. When the third clutch 58 is turned off, the second rotating member 54 and the fixing member 56 can rotate relatively to each other.

The first clutch 50, the second clutch 52, and the third clutch 58 are each coupled to the ECU 100. The ECU 100 controls on and off of the first clutch 50, the second clutch 52, and the third clutch 58. Here, like the first clutch 50, the second clutch 52, and the third clutch 58, the clutch that allows coupling and release of coupling by being turned on and off is publicly known. Therefore, the detailed descriptions of the configurations of these clutches are omitted.

The return mechanism 60 is installed on the steering shaft 14. The return mechanism 60 rotates the steering wheel 12 in a returning direction. The return mechanism 60 includes a motor 62, a motor gear 64, and a gear 66. The gear 66 is fixed by inserting the steering shaft 14 into the gear 66. The motor gear 64 is fixed to the motor shaft of the motor 62. The motor gear 64 and the gear 66 engage with each other.

Accordingly, when the transmission ratio variable mechanism 18 releases coupling between the steering shaft 14 and the wheel 20 and then the transmission ratio is set to zero, operating the motor 62 allows the steering shaft 14 to rotate.

In this embodiment, the ECU 100 controls on and off of the first clutch 50, the second clutch 52, and the third clutch 58 to transition to any of an ordinary-transmission-ratio state, a low-transmission-ratio state, and a zero-transmission-ratio state. The turning angle of the wheel 20 and the rotation angle of the main shaft 16 are proportional to each other. Therefore, a ratio of the rotation angle of the main shaft 16 to the steering angle of the steering wheel 12 will be described as a "transmission ratio" below. Here, in this embodiment, the "steering angle" means the rotation angle of the steering wheel 12 from the initial position of the steering wheel 12 to be positioned during straight running of the vehicle.

In the ordinary-transmission-ratio state, the transmission ratio is set to 1. That is, in the ordinary-transmission-ratio state, the main shaft 16 rotates by the same angle as the steering angle of the steering wheel 12. In the low-transmission-ratio state, the transmission ratio is set to 1/3. Accordingly, the main shaft 16 rotates by one-third of the steering angle of the steering wheel 12. In the zero-transmission-ratio state, the transmission ratio is set to zero. Accordingly, coupling between the steering shaft 14 and the main shaft 16 is released such that the main shaft 16 does not rotate even when the steering shaft 14 is steered. The following describes the ordinary-transmission-ratio state, the low-transmission-ratio state, and the zero-transmission-ratio state in association with FIG. 2A to FIG. 2C in detail.

Figure 2A:
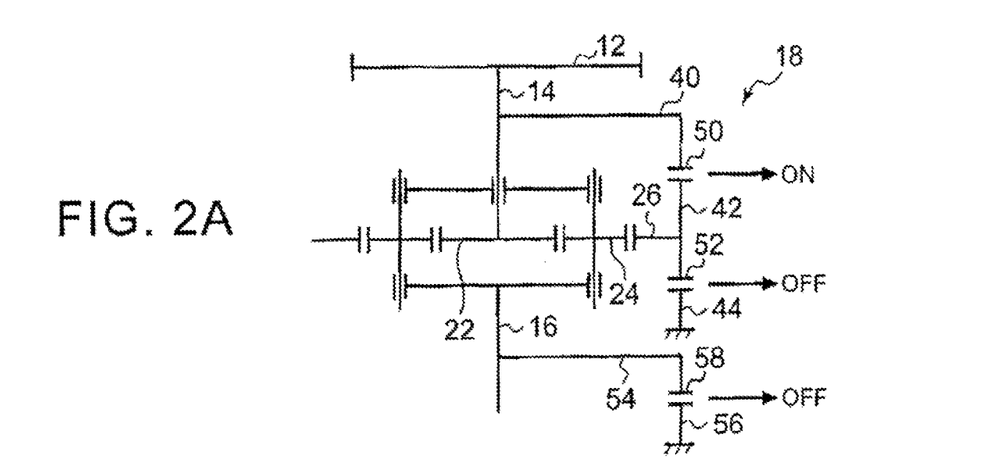
FIG. 2A is a diagram illustrating a transmission ratio variable mechanism in an ordinary-transmission-ratio state.

FIG. 2A is a diagram illustrating the transmission ratio variable mechanism 18 in the ordinary-transmission-ratio state. In the ordinary-transmission-ratio state, the ECU 100 turns on the first clutch 50, turns of the second clutch 52, and turns off the third clutch 58. Accordingly the steering shaft 14 and the ring gear 26 are fixed to each another via the first rotating member 40 and the drum 42. The steering shaft 14 and the sun gear 22 are preliminarily fixed to each other. Accordingly, the plurality of planetary gears 24 engaged with both the sun gear 22 and the ring gear 26 revolves by the same angle as the steering angle of the steering shaft 14 around the axis of the sun gear 22. The main shaft 16 rotates by the same angle as the revolution angle of the plurality of planetary gears 24 via the shaft 32 and the second disk 30. Accordingly, the main shaft 16 rotates by the same angle as the steering angle of the steering shaft 14, and the transmission ratio in the ordinary-transmission-ratio state becomes 1.

Figure 2B:
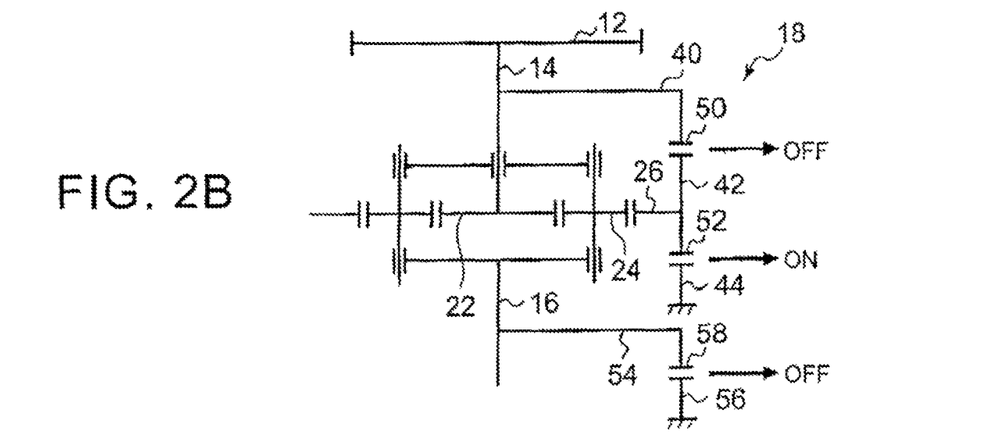

FIG. 2B is a diagram illustrating the transmission ratio variable mechanism 18 in the low-transmission-ratio state. In the low-transmission-ratio state, the ECU 100 turns off the first clutch 50, turns on the second clutch 52 and turns of the third clutch 58. Accordingly, the ring gear 26 is fixed to the vehicle main body via the dram 42 and the fixing member 44 so as not to be able to rotate. Consequently, when the steering shaft 14 rotates, the sun gear 22 rotates while the ring gear 26 does not rotate. The plurality of planetary gears 24 between the sun gear 22 and the ring gear 26 revolves the peripheral area of the sun gear 22 while rotating.

In this embodiment, when the ring gear 26 is thus fixed, the specifications of the respective gears are set so that the plurality of planetary gears 24 rotates one-third of a turn within one rotation of the sun gear 22. As described above, the revolution angle of the plurality of planetary gears 24 corresponds to the rotation angle of the main shaft 16. Accordingly, the main shaft 16 rotates by one-third of the steering angle of the steering shaft 14, and the transmission ratio in the low-transmission-ratio state becomes 1/3.

Figure 2C:
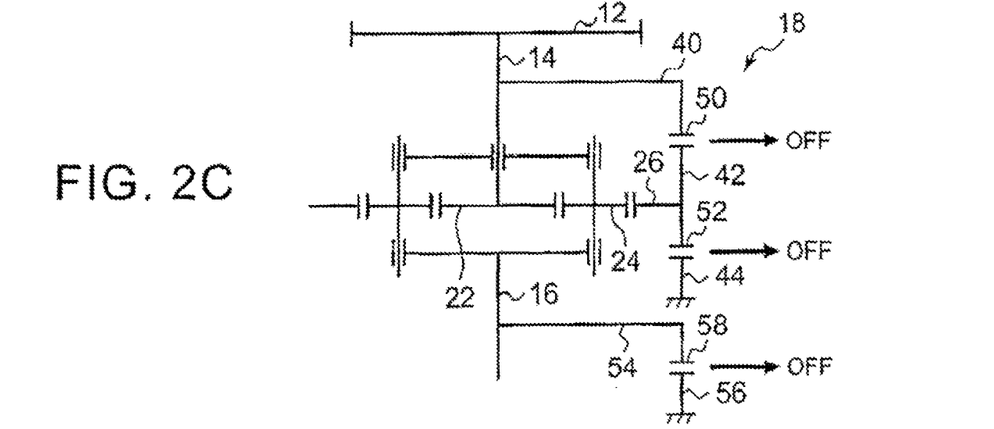

FIG. 2C is a diagram illustrating the transmission ratio variable mechanism 18 in the zero-transmission-ratio state. In the zero-transmission-ratio state, the ECU 100 turns off the first clutch 50, turns of the second clutch 52, and turns on the third clutch 58. Accordingly, the main shaft 16 is fixed to the vehicle, main body via the second rotating member 54 and the fixing member 56 so as not to be able to rotate. Consequently, the plurality of planetary gears 24 can rotate, but cannot revolve. On the other hand, the ring gear 26 is not fixed to the vehicle main body or the steering shaft 14. Accordingly, when the steering shaft 14 is rotated, the plurality of planetary gears 24 does not revolve, but rotates. Thus, the ring gear 26 runs idle in the opposite direction to the rotation direction of the sun gear 22. Consequently, the rotation angle of the main shaft 16 with respect to the steering angle of the steering shaft 14 becomes zero, and the transmission ratio in the zero-transmission-ratio state becomes zero.

Here, the transmission ratio variable mechanism 18 may set a second low-transmission-ratio state that causes reduction of the transmission ratio compared with the transmission ratio during additional steering when the steering wheel 12 is returned, instead of the zero-transmission-ratio state. For example, the transmission ratio variable mechanism 18 may include a second planetary gear mechanism for the second low-transmission-ratio state. In the second low-transmission-ratio state, this second planetary gear mechanism may be used to reduce the transmission ratio during returning of the steering wheel 12 compared with the transmission ratio during additional steering.

Here, during stationary steering, if the transmission ratio is high as the transmission ratio in the ordinary-transmission-ratio state, the driver needs a great deal of power to steer the steering wheel 12 without assistance for the steering force using the electric power steering unit or similar member. In contrast, it is also possible to have a countermeasure when the transmission-ratio variable device is used to reduce the transmission ratio during stationary steering. However, when the transmission ratio is reduced, it becomes difficult to turn the wheel 20 to a large degree even by steering the steering wheel 12 to the limit steering angle.

Accordingly, in this embodiment, in the case where the steering wheel 12 is steered at a vehicle speed less than a predetermined vehicle speed, the transmission ratio variable mechanism 18 reduces the transmission ratio compared with the case of steering at a vehicle speed equal to or more than the predetermined vehicle speed during additional steering of the steering wheel 12. On the other hand, during returning of the steering wheel 12, the transmission ratio variable mechanism 18 reduces the transmission ratio compared with the transmission ratio during additional steering. Specifically, the transmission ratio variable mechanism 18 determines whether a predetermined stationary steering condition required to be satisfied to determine that stationary steering of the steering wheel 12 is performed is satisfied, or whether a predetermined ordinary steering condition required to be satisfied to determine that the steering wheel 12 is steered during vehicle running is satisfied. In this embodiment, it is determined that the stationary steering condition is satisfied when the vehicle speed is less than a predetermined speed while it is determined that the ordinary steering condition is satisfied when the vehicle speed is equal to or more than the predetermined speed. Here, obviously, the stationary steering condition and the ordinary steering condition are not limited to these. In the case where the stationary steering condition is satisfied, the transmission ratio variable mechanism 18 reduces the transmission ratio compared with the case where the ordinary steering condition is satisfied during additional steering of the steering wheel 12 while the transmission ratio variable mechanism 18 releases coupling between the steering wheel 12 and the wheel 20 so as to set the transmission ratio to zero during returning of the steering wheel 12. Hereinafter, this transmission-ratio control in association with a flowchart will be described in detail.

Figure 3:
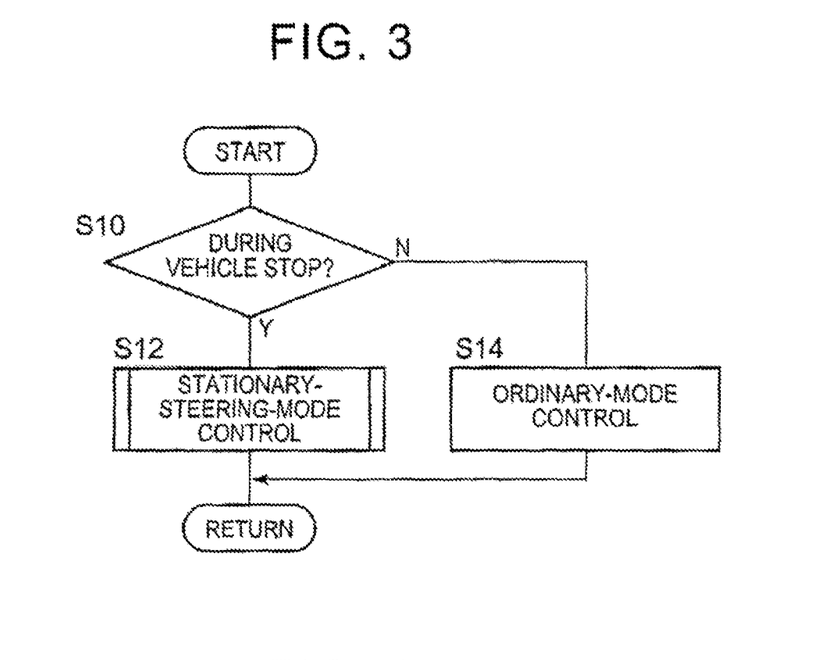
FIG. 3 is a flowchart illustrating an execution procedure of a steering control by a steering device according to this embodiment.

FIG. 3 is a flowchart illustrating an execution procedure of a steering control by the steering device 10 according to this embodiment in the vicinity of the wheel 20 of the vehicle on which the steering device 10 is mounted, a vehicle speed sensor (not illustrated) is disposed. The vehicle speed sensor detects a vehicle speed by detecting the rotation speed of the wheel 20. The ECU 100 acquires the detection result of the vehicle speed sensor to determine whether or not the vehicle speed is zero or whether or not the vehicle has a speed less than a predetermined speed considered as during stop, so as to determine whether or not the vehicle is stopped (in S10).

In case of during vehicle stop (Y in S10), the ECU 100 determines that the stationary steering condition is satisfied and then executes a stationary-steering-mode control. In case of during vehicle running (N in S10), the ECU 100 determines that the ordinary steering condition is satisfied and then executes an ordinary-mode control. In this ordinary-mode control, the ECU 100 turns on the first clutch 50, turns off the second clutch 52, and turns off the third clutch 58 so as to set the transmission ratio variable mechanism 18 to the ordinary-transmission-ratio state.

Figure 4:
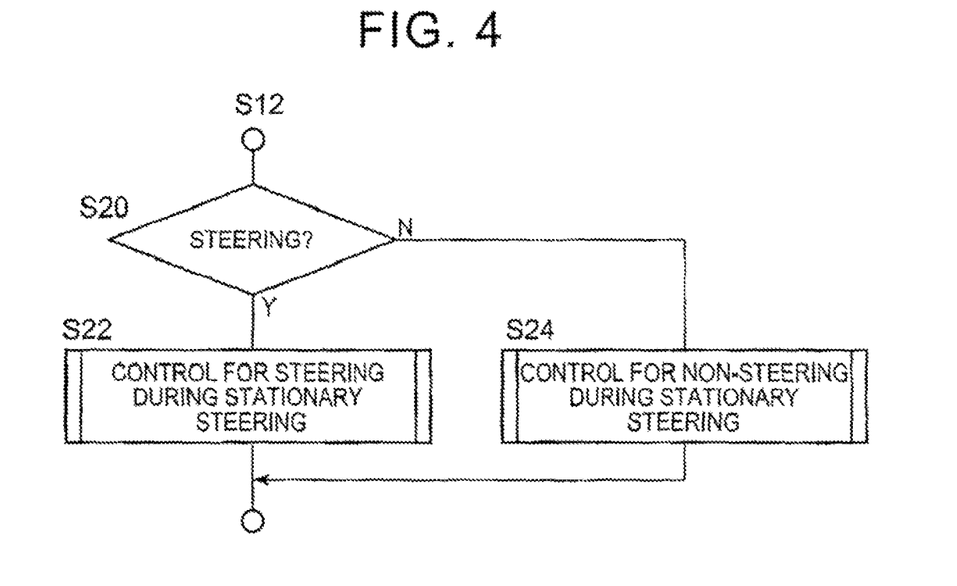
FIG. 4 is a flowchart illustrating the detail of an execution procedure of a stationary-steering-mode control in S12 in FIG. 3.

FIG. 4 is a flowchart illustrating the detail of the execution procedure of the stationary-steering-mode control in 812 in FIG. 3. At the steering shaft 14, a steering angle sensor (not illustrated) for detecting the steering angle of the steering shaft 14 is disposed. The ECU 100 acquires the detection result of the steering angle sensor. The ECU 100 uses the detection result of the steering angle sensor to determine whether or not the steering wheel 12 is steered (in S20). In the case where the steering wheel is steered (Y in S20), the ECU 100 executes a control for steering during stationary steering (in S22). In the case where the steering wheel 12 is not steered (N in S20), the ECU 100 executes a control for non-steering during stationary steering (in S24).

Figure 5:
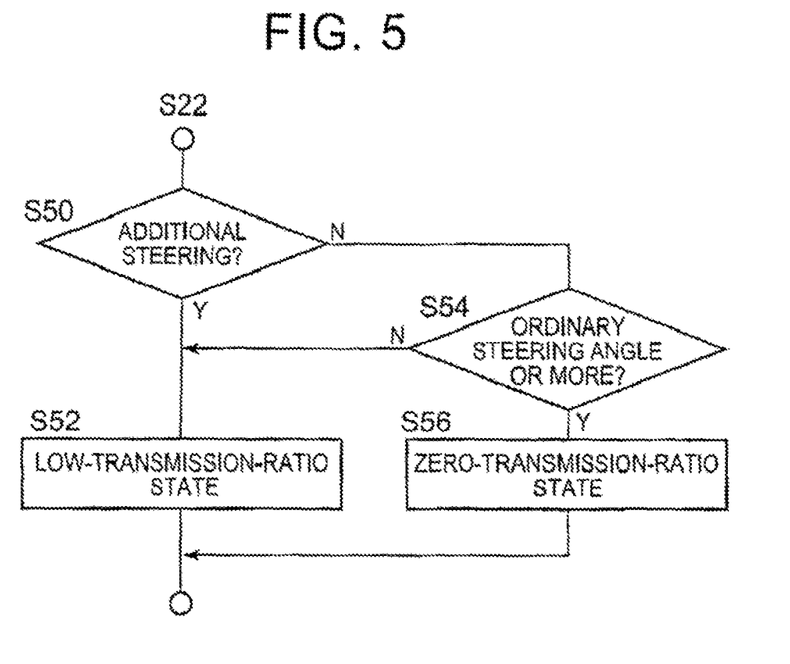
FIG. 5 is a flowchart illustrating an execution procedure of a control for steering during stationary steering in S22 in FIG. 4.

FIG. 5 is a flowchart illustrating an execution procedure of the control for steering during stationary steering in S22 in FIG. 4. In the control for steering during stationary steering, the ECU 100 uses the detection result of the steering angle sensor to determine whether the steering wheel 12 is increasingly steered or returned (in S50). In the case where the steering wheel 12 is increasingly steered (Y in S50), the ECU 100 turns off the first clutch 50, turns on the second clutch 52, and turns off the third clutch 58 so as to set the transmission ratio variable mechanism 18 to the tow-transmission-ratio state (in S52).

Hereinafter, when the steering wheel 12 is steered in the ordinary-transmission-ratio state, the steering angle of the steering wheel 12 corresponding to the turning angle of the wheel 20 is referred to as an ordinary steering angle. In the case where the steering wheel 12 is returned (N in S50), the ECU 100 determines whether or not the steering angle of the steering wheel 12 at this time is equal to or more than an ordinary steering angle (in S54).

In the case where the steering angle is equal to or more than the ordinary steering angle (Y in S54), the ECU 100 turns off the first clutch 50, turns off the second clutch 52, and tarns on the third clutch 58 so as to set the transmission ratio variable mechanism 18 to the zero-transmission-ratio state (in S56). Thus, in the case where the steering wheel 12 is returned when the stationary steering condition is satisfied, the transmission ratio variable mechanism 18 sets the transmission ratio to zero until the steering wheel 12 reaches the ordinary steering angle to be positioned in order to turn the wheel 20 to the angle of the wheel 20 at which the returning of the steering wheel 12 is started when the ordinary steering condition is satisfied. This allows the driver to increasingly steer the steering wheel 12 in the low-transmission-ratio state and to return the steering wheel 12 in the zero-transmission-ratio state. Accordingly, repeating additional steering and returning allows steering the steering wheel 12 to a large degree with a lower steering force than the steering force in the ordinary-transmission-ratio state.

In the case where the steering angle is not equal to or more than the ordinary steering angle (N in S54), the ECU 100 turns of the first clutch 50, turns on the second clutch 52, and turns off the third clutch 58 so as to set the transmission ratio variable mechanism 18 to the low-transmission-ratio state (in S52). Accordingly, in the case where the steering wheel 12 is attempted to be returned to an angle smaller than the ordinary steering angle, the state is set to not the zero-transmission-ratio state but the low-transmission-ratio state. This allows returning the turning angle of the wheel 20 in the low-transmission-ratio state.

Figure 6:
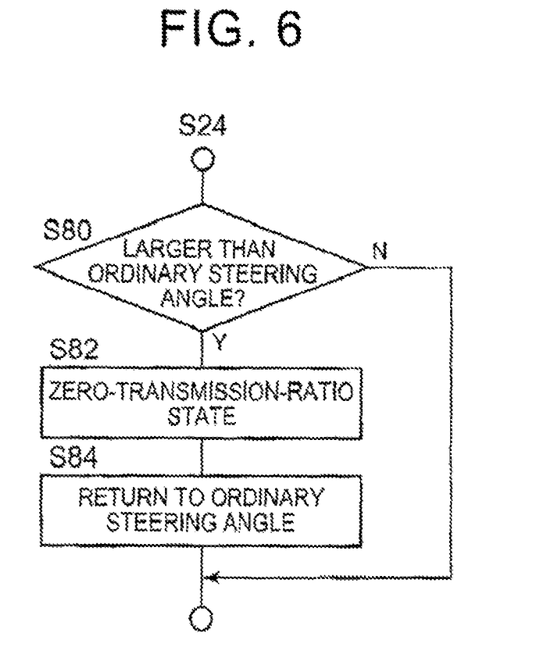
FIG. 6 is a flowchart illustrating an execution procedure of a control for non-steering during stationary steering in S24 in FIG. 4.

FIG. 6 is a flowchart illustrating an execution procedure of the control for non-steering during stationary steering in S24 in FIG. 4. The ECU 100 determines whether or not the steering angle of the steering wheel 12 at this time is larger than the ordinary steering angle (in S80).

In the case where the steering angle is larger than the ordinary steering angle (Y in S80), the ECU 100 turns off the first clutch 50, turns off the second clutch 52, and turns on the third clutch 58 so as to set the transmission ratio variable mechanism 18 to the zero-transmission-ratio state (in S82). Subsequently, the ECU 100 operates the return mechanism 60 to return the steering wheel 12 to the ordinary steering angle (in S84). Accordingly, in the case where the steering force to the steering wheel 12 is released in the stationary-steering mode, the ECU 100 returns the steering wheel 12 until the steering angle reaches the ordinary steering angle. This allows a smooth transition to an ordinary mode when the vehicle starts running. In the case where the steering angle of the steering wheel 12 is already the ordinary steering angle (N in S80), the ECU 100 skips S82 and S84 so as to avoid the returning operation of the steering wheel 12.

Figure 7A:
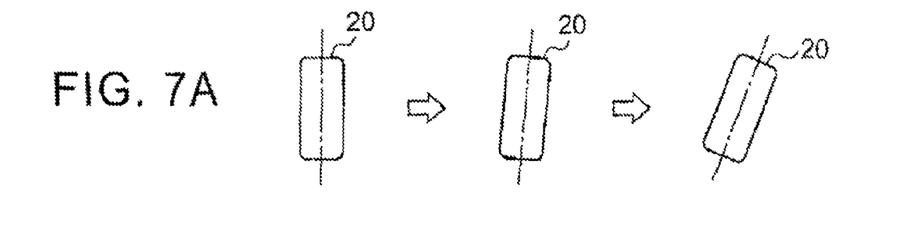
FIG. 7A is a diagram illustrating a situation where a wheel is gradually turned.
Figure 7B:
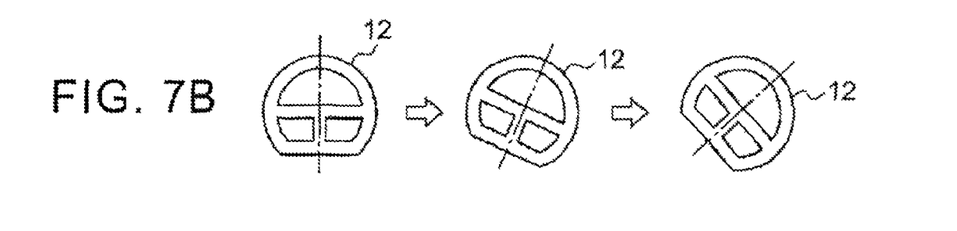
FIG. 7B is a diagram illustrating steering angles of a steering wheel to achieve turning angles of the wheel illustrated in FIG. 7A in an ordinary mode.

FIG. 7A is a diagram illustrating a situation where the wheel 20 is gradually turned. FIG. 7B is a diagram illustrating the steering angles of the steering wheel 12 to achieve the turning angles of the wheel 20 illustrated in FIG. 7A in the ordinary mode. Accordingly, in the ordinary mode, the wheel 20 can be turned without steering the steering wheel 12 to a large degree.

Figure 7C:
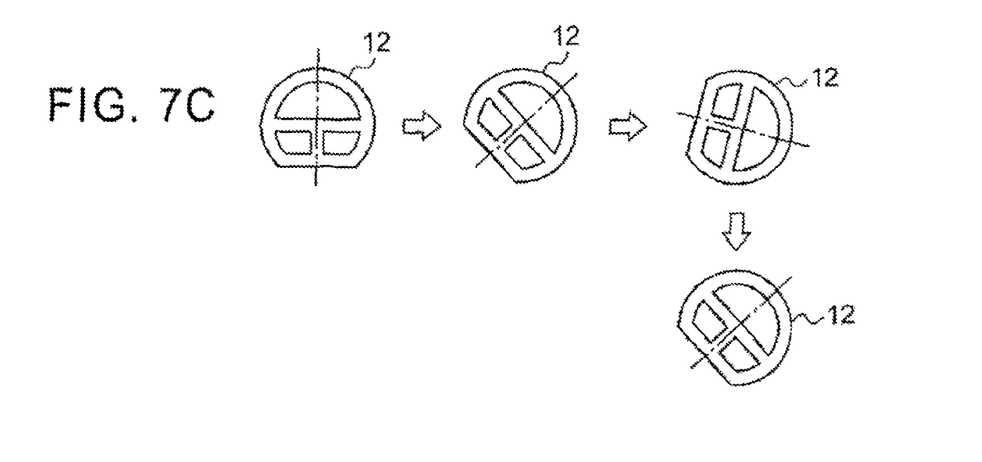
FIG. 7C is a diagram illustrating steering angles of the steering wheel to achieve the turning angles of the wheel illustrated in FIG. 7A.

FIG. 7C is a diagram illustrating the steering angles of the steering wheel 12 to achieve the turning angles of the wheel 20 illustrated in FIG. 7A. Thus, in the stationary-steering mode, it is necessary to steer the steering wheel 12 to a large degree in order to turn the wheel 20 similarly to the ordinary mode. However, the steering wheel 12 can be steered with a correspondingly small steering force. Simply releasing the steering wheel 12 after steering the steering wheel 12 by the driver allows automatically returning the steering wheel 12 to the ordinary steering angle, which is the steering angle of the steering wheel 12 to be positioned in the ordinary mode. This allows increasing the frequency for positioning the steering wheel 12 at the ordinary steering angle, thus allowing a smooth transition to the ordinary mode even when the vehicle starts running.

Figure 8A:
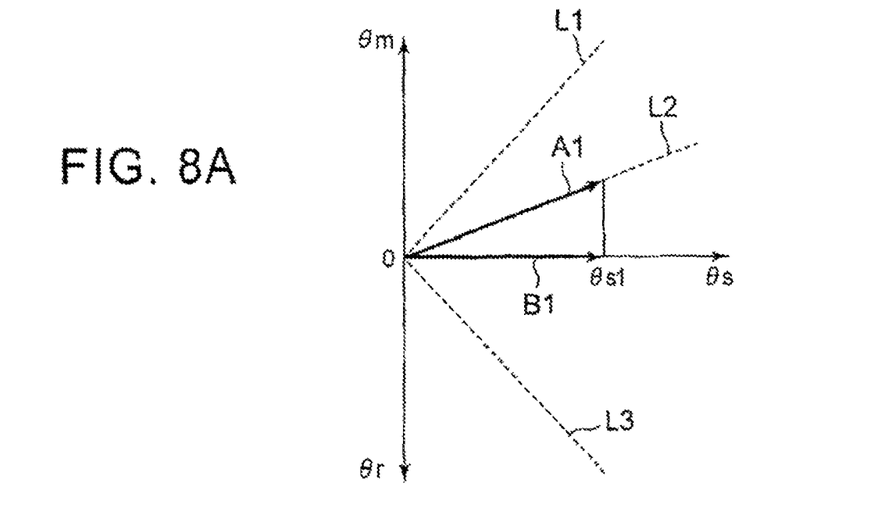
FIG. 8A is a diagram illustrating a main-shaft angle θm and a ring-gear angle θr with respect to a steering-wheel angle θs when the steering wheel is increasingly steered in a stationary-steering mode.
Figure 8B:
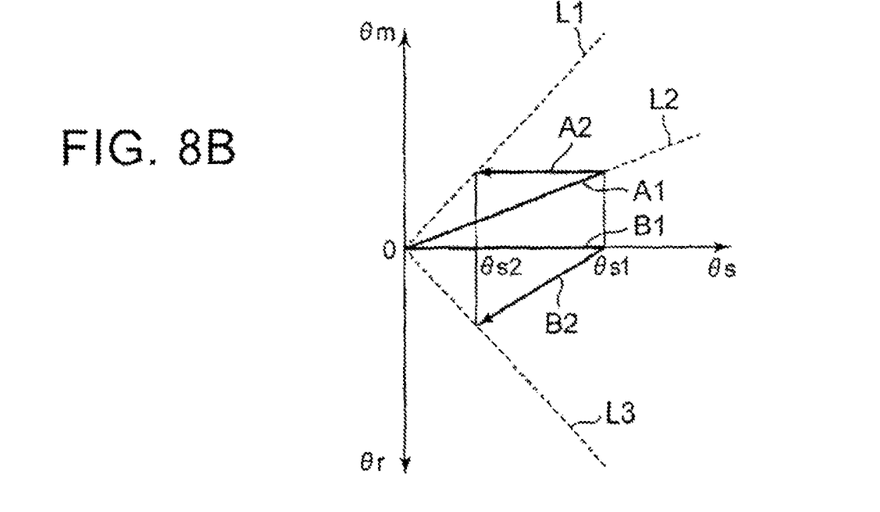
FIG. 8B is a diagram illustrating the main-shaft angle θm and the ring-gear angle θr with respect to the steering-wheel angle θs when the steering wheel is released after the state in FIG. 8A.

FIG. 8A is a diagram illustrating the main-shaft angle $\theta m$ and the ring-gear angle $\theta r$ with respect to the steering-wheel angle $\theta s$ when the steering wheel 12 is increasingly steered in the stationary-steering mode. In FIG. 8A and FIG. 8B, $\theta s$ denotes the steering-wheel angle, $\theta m$ denotes the main-shaft angle, and $\theta r$ denotes the ring-gear angle. The steering-wheel angle $\theta s$ represents the steering angle of the steering wheel 12 from the initial position during straight running of the vehicle. The main-shaft angle $\theta m$ represents the rotation angle of the main shaft 16 from the initial position during straight running of the vehicle. The rotation angle of the ring gear 26 from the initial position during straight running of the vehicle is represented.

A line L1 illustrates the relationship between the steering-wheel angle $\theta s$ and the main-shaft angle $\theta m$ in the ordinary-transmission-ratio state. A line L2 illustrates the relationship between the steering-wheel angle $\theta s$ and the main-shaft angle $\theta m$ in the low-transmission-ratio state. A line L3 illustrates the relationship between the steering-wheel angle $\theta s$ and the ring-gear angle $\theta r$ in the ordinary-transmission-ratio state.

As illustrated in FIG. 8A, while the steering wheel 12 is steered and then the steering-wheel angle $\theta s$ is increased to a first steering angle $\theta s1$ equal to or less than the limit steering angle, a relationship A1 between the steering-wheel angle $\theta s$ and the main-shaft angle $\theta m$ transitions along the line L2. Accordingly, the main-shaft angle $\theta m$ rotates by one-third of the angle of L1 indicative of during the ordinary mode, and the driver can steer the steering wheel 12 with a correspondingly small steering force. On the other hand, while the steering-wheel angle $\theta s$ is increased to the first steering angle $\theta s1$ equal to or less than the limit steering angle, the ring gear 26 is locked. Accordingly, the relationship B1 between the steering-wheel angle $\theta s$ and the ring-gear angle $\theta r$ shifts parallel to the horizontal axis while the ring-gear angle $\theta r$ remains as zero.

FIG. 8B is a diagram illustrating the main-shaft angle θm and the ring-gear angle θr with respect to the steering-wheel angle θs when the steering wheel 12 is released after the state in FIG. 8A.

When the steering wheel 12 is released after the steering-wheel angle θs is increased to the first steering angle θs1, the return mechanism 60 rotates the steering wheel 12 in the returning direction to reduce the steering-wheel angle θs. At this time, the main shaft 16 is locked and the main-shaft angle θm does not change. Accordingly, a relationship A2 between the steering-wheel angle θs and the main-shaft angle θm becomes parallel to the horizontal axis. The steering-wheel angle θs reaches the ordinary steering angle when A2 has reached the line L1. Accordingly, the returning operation of the steering wheel 12 by the return mechanism 60 is stopped at a second steering angle θs2.

When the steering wheel 12 is released, the state is set to the zero-transmission-ratio state and then the lock of the ring gear 26 is released. A relationship B2 between the steering-wheel angle θs and the ring-gear angle θr linearly changes to intersect with the line L3 when the steering-wheel angle θs has reached the second steering angle θs2. Further, in the case where the wheel 20 is desired to be turned, the driver repeats the operation of increasingly steering the steering wheel 12 and then releasing the steering wheel 12 to return the steering wheel 12 to the ordinary steering angle, so as to allow additionally turning the wheel 20.

The present invention is not limited to the above-described embodiments only and those resulting from any combination of the embodiments are also effective as embodiments. Also, it is understood by those skilled, in the art that various modifications such as changes in design may be added to the embodiments based on their knowledge and embodiments added with such modifications are also within the scope of the present invention.

REFERENCE SIGNS LIST

10 steering device, 12 steering wheel, 14 steering shaft, 16 main shaft, 18 transmission ratio variable mechanism, 19 steering mechanism, 20 wheel, 22 sun gear, 24 planetary gear, 26 ring gear, 28 first disk, 30 second disk, 32 shaft, 40 first rotating member, 42 drum, 44 fixing member, 50 first clutch, 52 second clutch, 54 second rotating member, 56 fixing member, 58 third clutch, 100 ECU.

INDUSTRIAL APPLICABILITY

The present invention can be used for a steering device, in particular, for a steering device that includes a transmission ratio variable mechanism.

The invention claimed is:

1. A steering device, comprising:
   a steering wheel; and
   a transmission ratio variable mechanism configured to change a transmission ratio, the transmission ratio being a ratio of a turning angle of a vehicle wheel to a steering angle of the steering wheel, wherein
   in a case where (i) the steering wheel is steered at a vehicle speed less than a predetermined vehicle speed and (ii) the steering wheel is increasingly steered, the transmission ratio variable mechanism reduces the transmission ratio compared with a case of steering at a vehicle speed equal to or more than the predetermined vehicle speed, and
   in a case where (i) the steering wheel is steered at a vehicle speed less than the predetermined vehicle speed and (ii) the steering wheel is returned, the transmission ratio variable mechanism reduces the transmission ratio compared with the case where the steering wheel is increasingly steered at a vehicle speed less than the predetermined vehicle speed.

2. The steering device according to claim 1, wherein
   in the case where the steering wheel is returned at a vehicle speed less than the predetermined vehicle speed, the transmission ratio variable mechanism reduces the transmission ratio compared with the transmission ratio during additional steering until the steering wheel reaches an ordinary steering angle to be positioned in order to turn the vehicle wheel to an angle of the vehicle wheel at which returning of the steering wheel is started when the vehicle speed is equal to or more than the predetermined vehicle speed.

3. The steering device according to claim 2, wherein
   the transmission ratio variable mechanism is configured to allow the steering wheel to rotate at least in a returning direction, and
   in a case where a steering force to the steering wheel is released at a vehicle speed less than the predetermined vehicle speed, the transmission ratio variable mechanism returns the steering wheel until the steering wheel reaches the ordinary steering angle.

* * * * *